United States Patent
Cheng et al.

(10) Patent No.: US 6,293,999 B1
(45) Date of Patent: Sep. 25, 2001

(54) PROCESS FOR SEPARATING PROPYLENE FROM PROPANE

(75) Inventors: Linda S. Cheng, Chicago; Stephen T. Wilson, Libertyville, both of IL (US)

(73) Assignee: UOP LLC, Des Plaines, IL (US)

(*) Notice: Subject to any disclaimer, the term of this patent is extended or adjusted under 35 U.S.C. 154(b) by 0 days.

(21) Appl. No.: 09/451,567

(22) Filed: Nov. 30, 1999

(51) Int. Cl.[7] .................................................. B01D 53/047
(52) U.S. Cl. .......................... 95/96; 95/103; 95/106; 95/144; 95/902
(58) Field of Search .................. 95/96–107, 110, 95/111, 144, 900, 902

(56) References Cited

U.S. PATENT DOCUMENTS

| | | | | |
|---|---|---|---|---|
| Re. 29,941 | * | 3/1979 | Bird | 95/98 X |
| 2,978,407 | * | 4/1961 | Tuttle et al. | 95/104 X |
| 3,176,444 | | 4/1965 | Kiyonaga | 55/26 |
| 3,176,445 | * | 4/1965 | Collins et al. | 95/144 X |
| 3,266,221 | * | 8/1966 | Avery | 95/144 X |
| 3,306,006 | * | 2/1967 | Urban | 95/144 X |
| 3,430,418 | | 3/1969 | Wagner | 55/25 |
| 3,703,068 | | 11/1972 | Wagner | 55/21 |
| 3,727,376 | * | 4/1973 | Szirmay | 95/111 |
| 3,986,849 | | 10/1976 | Fuderer et al. | 55/25 |
| 4,070,164 | * | 1/1978 | Miwa et al. | 95/101 |
| 4,310,440 | | 1/1982 | Wilson et al. | 252/435 |
| 4,554,141 | * | 11/1985 | Scull et al. | 95/144 |
| 4,567,029 | | 1/1986 | Wilson et al. | 423/306 |
| 4,769,047 | * | 9/1988 | Dye | 95/97 |
| 4,861,938 | | 8/1989 | Lewis et al. | 585/640 |
| 4,973,792 | | 11/1990 | Lewis et al. | 585/638 |
| 5,095,163 | | 3/1992 | Barger | 585/640 |
| 5,104,425 | * | 4/1992 | Rao et al. | 95/144 X |
| 5,126,308 | | 6/1992 | Barger et al. | 502/214 |
| 5,171,333 | * | 12/1992 | Maurer | 95/103 X |
| 5,191,141 | | 3/1993 | Barger et al. | 585/640 |
| 5,245,099 | * | 9/1993 | Mitariten | 95/144 X |
| 5,365,011 | | 11/1994 | Ramachandran et al. | 585/829 |
| 5,507,857 | * | 4/1996 | Kumar et al. | 95/144 X |
| 5,518,527 | * | 5/1996 | Tomizuka et al. | 95/144 X |
| 5,672,197 | | 9/1997 | Rothchild | 95/98 |
| 5,744,687 | | 4/1998 | Ramachandran et al. | 585/829 |

OTHER PUBLICATIONS

Article entitled "Better Ethylene Separation Unit" by V. Kaiser and M.Picciotti, *Hydrocarbon Processing*, Nov. 1988, pp. 57–61.

Paper entitled "Olefin–Paraffin Separations by Adsorption: Equilibrium Separation by π–Complexation vs. Kinetic Separation" by S.U. Rege, J. Padin, and R.T. Yang, *AIChE Journal*, vol. 44, 1998, p. 799.

* cited by examiner

*Primary Examiner*—Robert H. Spitzer
(74) *Attorney, Agent, or Firm*—John G. Tolomei; Frank S. Molinaro; Richard P. Silverman

(57) ABSTRACT

A process is provided for the concentration and recovery of propylene from propane using an adsorbent comprising AlPO-14 at adsorption temperatures less than 120° C. and an adsorption pressure comprising a propylene partial pressure between about 0.5 bar and about 4 bar. The AlPO-14 adsorbent can be employed as a selective adsorbent for the separation of propylene from mixtures thereof with propane in vacuum swing adsorption processes, thermal swing adsorption processes, and combinations thereof. A simulated moving bed process using vacuum swing adsorption is used to remove propylene from a $C_3$ hydrocarbon stream comprising propylene and propane and recover a high purity propylene product at a high recovery rate. The simulated moving bed vacuum swing adsorption process of the present invention can be employed in a variety of petroleum refining and petrochemical processes to purify and separate propylene from mixtures of propylene and propane alone or in combination with fractionation.

15 Claims, 5 Drawing Sheets

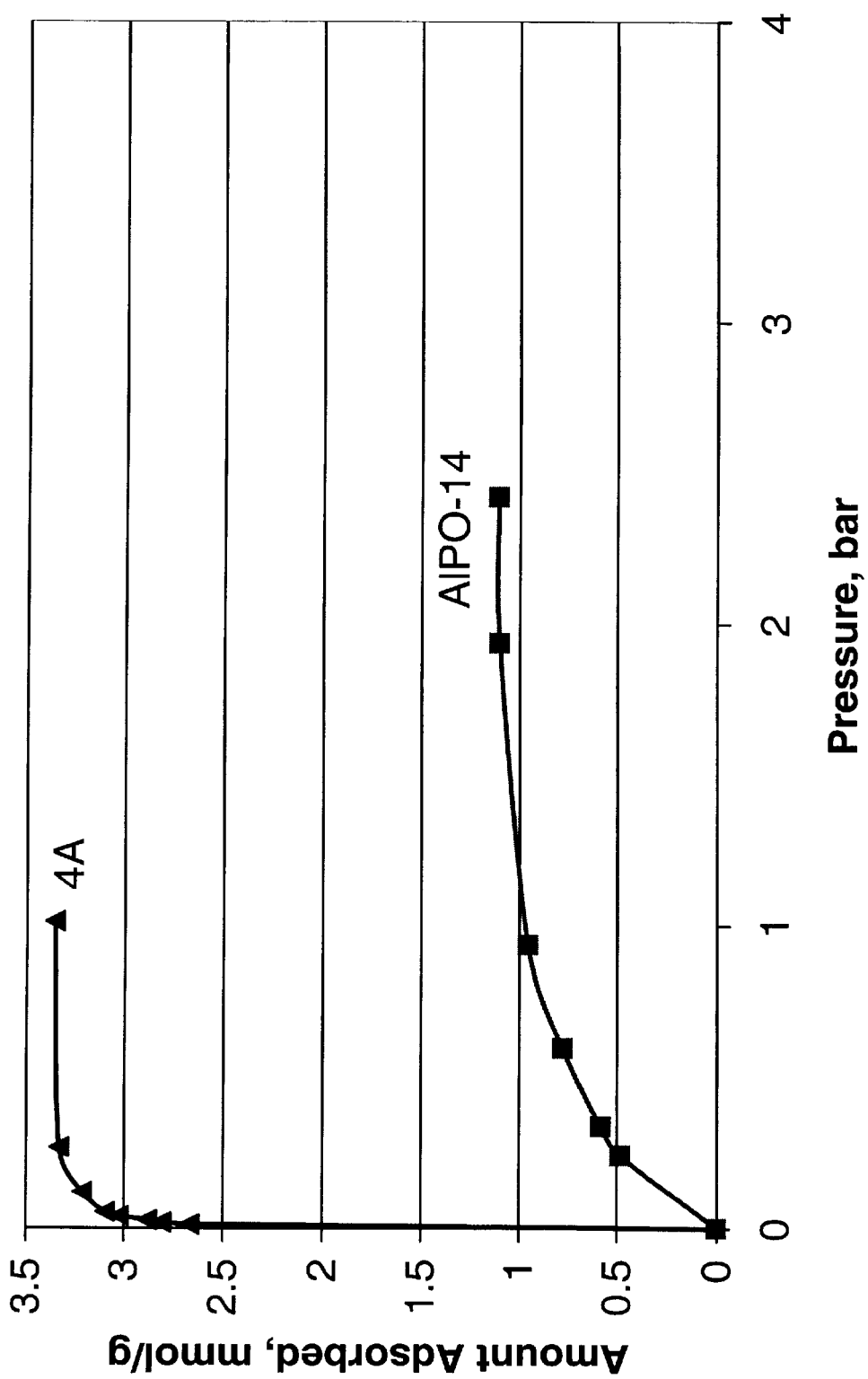
FIG. 2 ADSORPTION ISOTHERM AT 25 °C

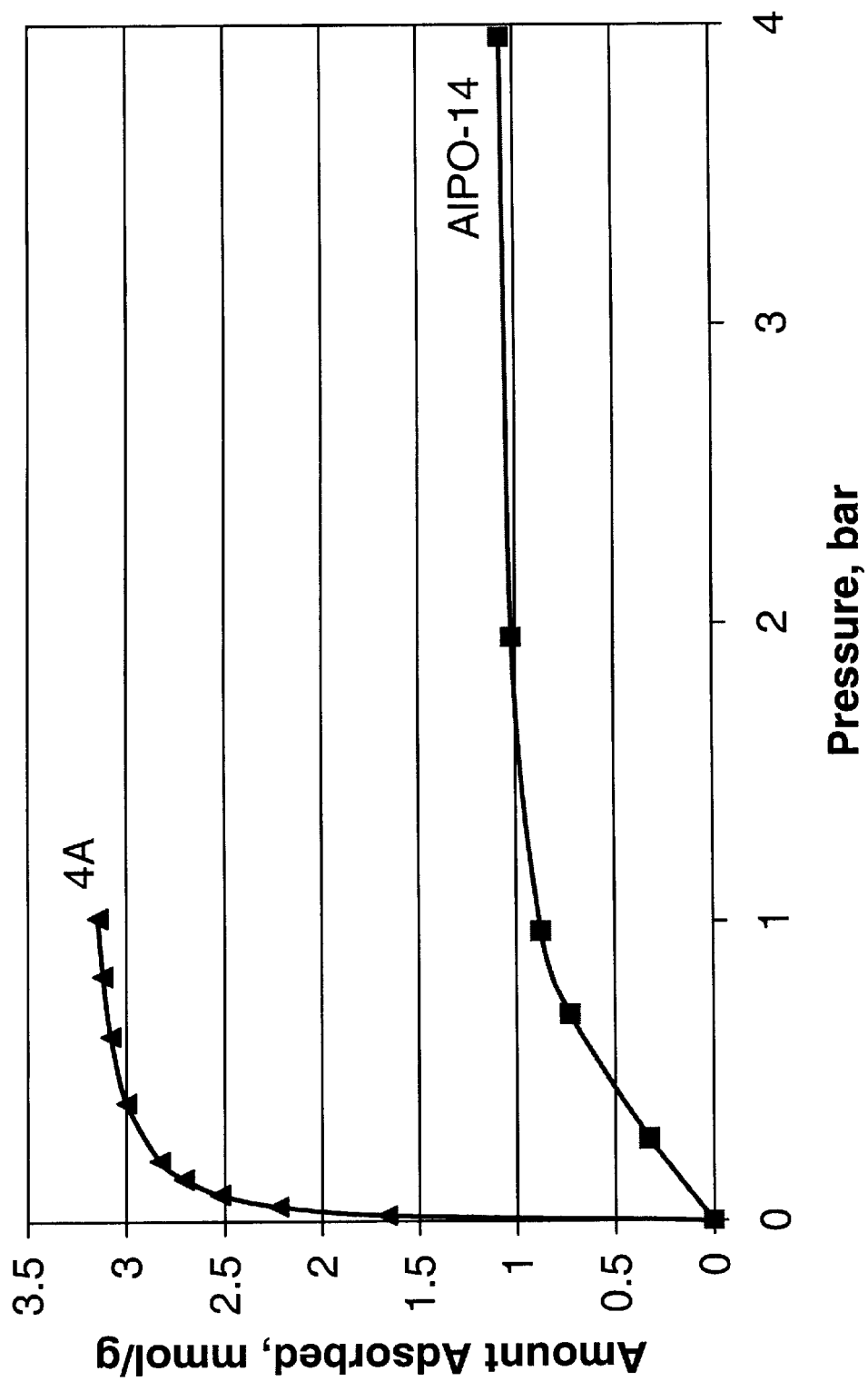
FIG. 3 ADSORPTION ISOTHERM AT 70 °C

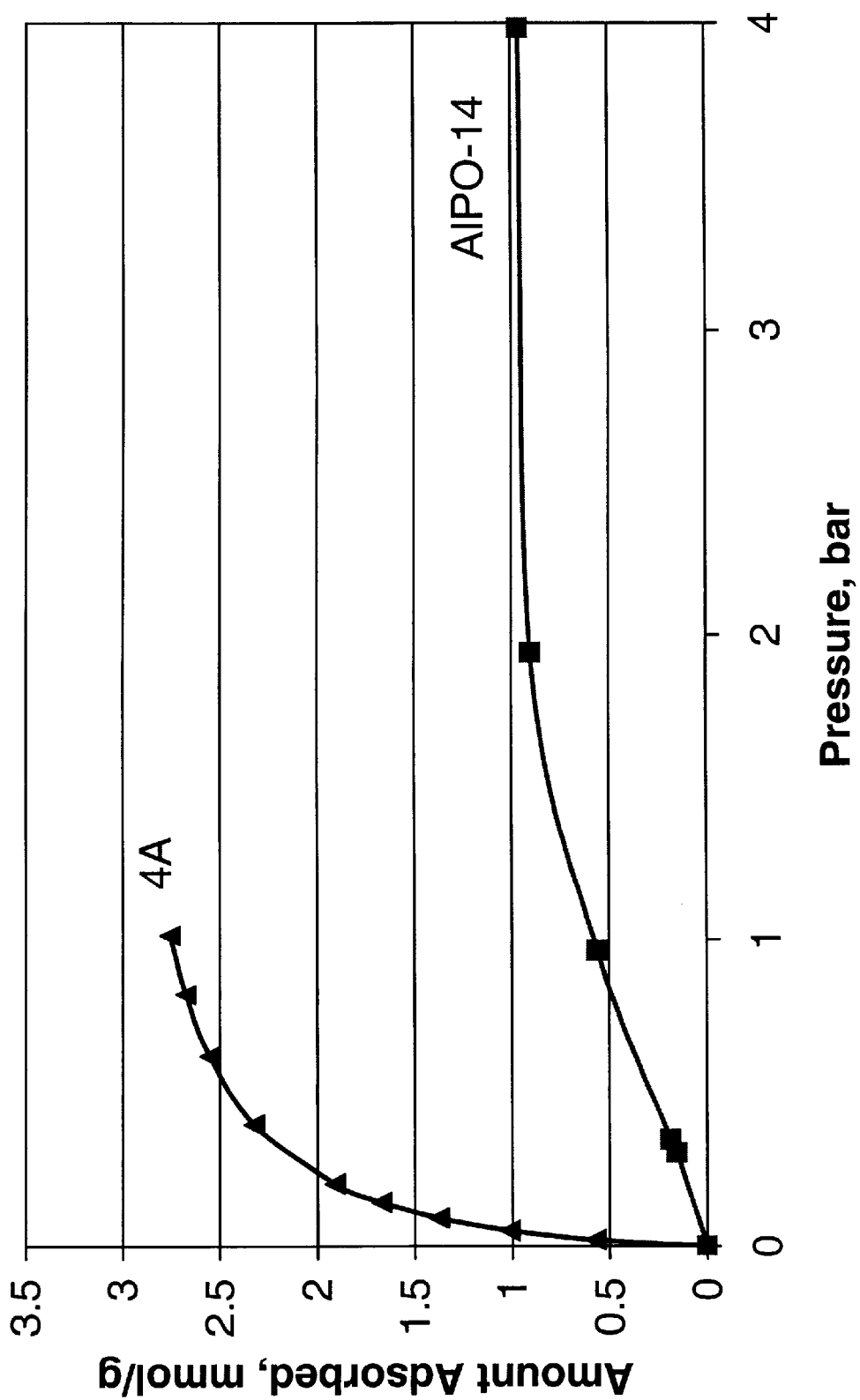
FIG. 4 ADSORPTION ISOTHERM AT 120 °C

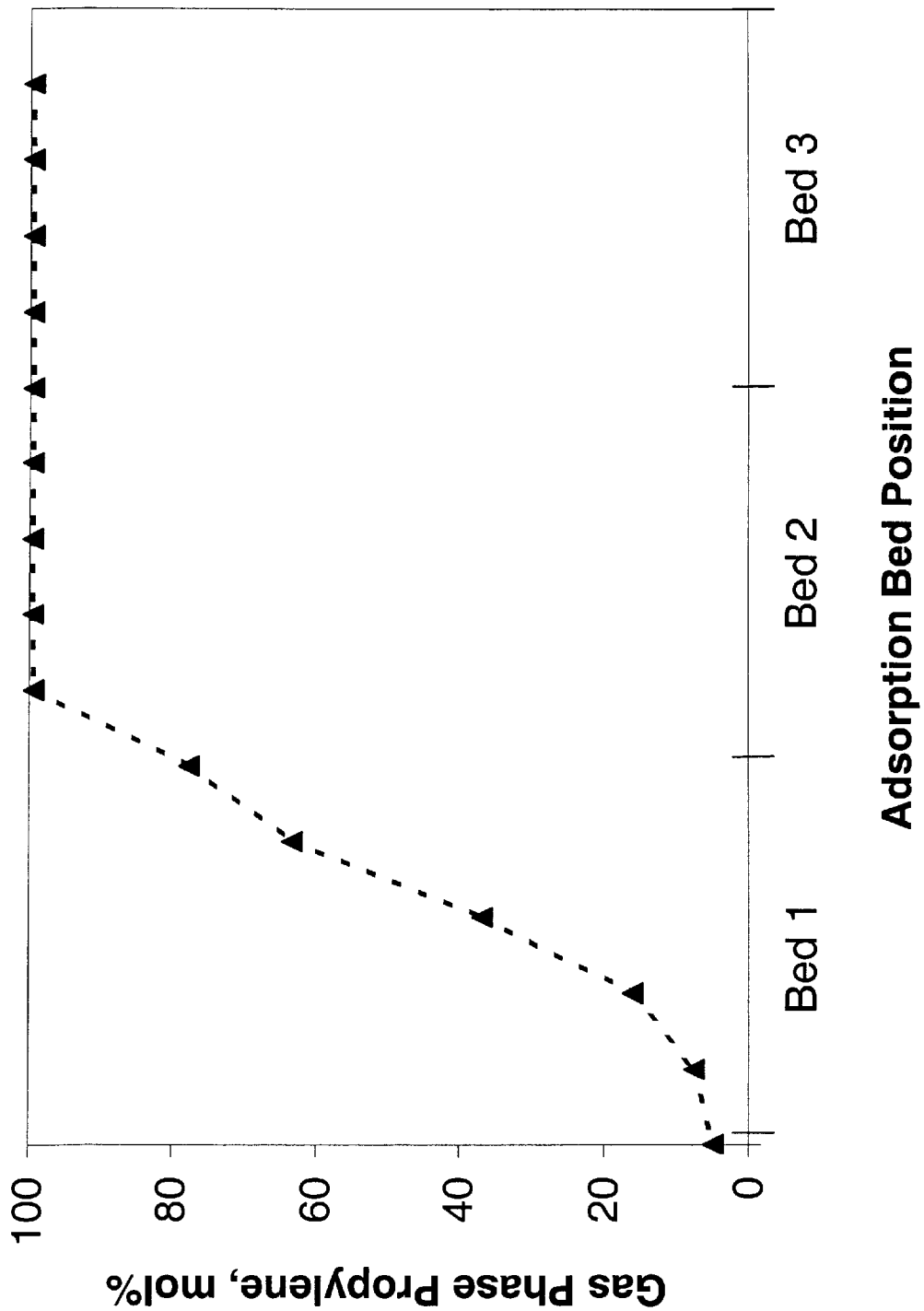
FIG. 5 Gas Phase Propylene Profile

PROCESS FOR SEPARATING PROPYLENE FROM PROPANE

FIELD OF THE INVENTION

This invention pertains to the field of separating and recovering at least one gas component from a feedstream by an adsorption process. More particularly, the present invention relates to an adsorption process for separating a hydrocarbon feed gas comprising propylene and propane into a fraction comprising predominantly propylene and a fraction comprising propane.

BACKGROUND OF THE INVENTION

Light olefins serve as the building blocks for the production of numerous chemicals. Light olefins have traditionally been produced through the process of steam or catalytic cracking. Propylene, a light olefin consisting of three carbon atoms wherein two of the carbon atoms are joined by a double bond, has a great number of commercial applications, particularly in the manufacture of polypropylene, isopropyl alcohol, propylene oxide, cumene, synthetic glycerol, isoprene, and oxo alcohols. When propylene is produced in the presence of hydrogen, it is often accompanied by the formation of propane. Propane is a paraffin, a saturated hydrocarbon which is used as a component of household fuel, as an extractant, a refrigerant, or an aerosol propellant. Generally, it is required to separate propane from propylene before the propylene can be used to produce more valuable products. However, the boiling points of propane and propylene are very close to one another and separating propane from propylene has traditionally required an energy-intensive fractionation process known as superfractionation. Superfractionation generally refers to fractional distillation of compounds having the same number of carbon atoms per molecule.

The reaction product produced by a conversion process such as fluid catalytic cracking, pyrolysis of naphtha, and conversion of methanol to olefins is a light gas stream containing lighter components (e.g. hydrogen, nitrogen, etc.) methane, ethane and a substantial quantity of hydrocarbons of higher molecular weight, for example, propane, butane, pentane, and often their unsaturated analogs. Separation of these components to recover propylene requires a complex energy-intensive scheme, thus creating a need for more efficient separation processes which yield higher recovery levels of propylene. A typical ethylene separation section of an ethylene plant containing both cryogenic and fractionation steps to recover an ethylene product with a purity exceeding 99.5% ethylene is described in an article by V. Kaiser and M. Picciotti entitled, "Better Ethylene Separation Unit," that appeared in *Hydrocarbon Processing*, November 1988, pages 57–61 and is herein incorporated by reference. In the production of propylene,: a by-product of the conversion process, a reactor effluent stream recovered from the conversion process is passed to a complex series of separation stages involving a combination of compression and fractionation steps to recover a $C_3$ hydrocarbon stream. Conventionally, the $C_3$ hydrocarbon stream is passed to a superfractionator known as a $C_3$ splitter to perform the separation of propylene from a feedstream consisting essentially of propylene and propane to produce a high purity propylene stream and a propane-containing stream. The $C_3$ splitter, or superfractionator, makes the final separation between propylene and propane. In this separation, propylene is removed as an overhead stream, and the propane stream is removed as the $C_3$ splitter bottom stream. The higher the purity of the propylene desired, the more energy intensive is the degree of superfractionation in the $C_3$ splitter. Typically, the $C_3$ splitter or propane/propylene splitter requires so many theoretical separation stages, or trays, that the column is constructed as two separate towers: a rectifier and a stripper. Lighter components such as hydrogen and methane which may be present in the $C_3$ hydrocarbon stream further complicate the separation.

Pressure swing adsorption (PSA) provides an efficient and economical means for separating a multi-component gas stream containing at least two gases having different adsorption characteristics. The more strongly adsorbable gas can be an impurity which is removed from the less strongly adsorbable gas which is taken off as product; or, the more strongly adsorbable gas can be the desired product, which is separated from the less strongly adsorbable gas. In PSA, a multi-component gas is typically fed to at least one of a plurality of adsorption zones at an elevated pressure effective to adsorb at least one component, while at least one other component passes through. At a defined time, the feedstream to the adsorber is terminated and the adsorption zone is depressurized by one or more co-current depressurization steps wherein pressure is reduced to a defined level which permits the separated, less strongly adsorbed component or components remaining in the adsorption zone to be drawn off without significant concentration of the more strongly adsorbed components. Then, the adsorption zone is depressurized by a counter-current depressurization step wherein the pressure on the adsorption zone is further reduced by withdrawing desorbed gas counter-currently to the direction of the feedstream. Finally, the adsorption zone is purged and repressurized. The combined gas stream produced during the counter-current depressurization step and the purge step is typically referred to as the tail gas stream. The final stage of repressurization is typically performed by introducing a slipstream of product gas comprising the lightest gas component produced during the adsorption step. This final stage of repressurization is often referred to as product repressurization. In multi-zone systems, there are typically additional steps, and those noted above may be done in stages. U.S. Pat. No. 3,176,444 issued to Kiyonaga, U.S. Pat. No. 3,986,849 issued to Fuderer et al., and U.S. Pat. Nos. 3,430,418 and 3,703,068 both issued to Wagner, among others, describe multi-zone, adiabatic PSA systems employing both co-current and counter-current depressurization, and the disclosures of these patents are incorporated by reference in their entireties.

U.S. Pat. No. 5,672,197, hereby incorporated by reference, discloses a process for the separation of a mixture of gases wherein an internal gas flow is pumped througha plurality of beds containing a pressure dependent adsorbent. The beds are connected in series. Gas is pumped from the most upstream of the beds to generate the internal gas flow, displacing gas through the series in the downstream direction. A first inlet flow is withdrawn from the most upstream bed. The first outlet flow consists primarily of the most highly adsorbed component. Feedstock is added downstream of the first outlet, separated by at least one bed and a second outlet flow is withdrawn from a second outlet in fluid communication with the most downstream bed in series. At the end of the cycle, gas pressure in the most downstream bed is increased to operating pressure, while pressure in the most upstream bed is reduced to the lower pressure. At the end of the cycle, valves are used to switch positions of the inlet and outlet ports and bed connections so that each bed effectively advances upstream with respect to the internal gas flow by one position, except for the most upstream bed which is effectively moved to the most downstream position.

Various classes of adsorbents are known to be suitable for use in PSA systems, the selection of which is dependent upon the feedstream components and other factors. Molecular sieves such as the microporous crystalline zeolite and non-zeolitic catalysts, particularly aluminophosphates (AlPO) and silicoaluminophosphates (SAPO), are known to promote reactions such as the conversion of oxygenates to hydrocarbon mixtures. Numerous patents describe this process for various types of these catalysts: U.S. Pat. No. 4,310,440 (Wilson et al.), U.S. Pat. No. 4,567,029 (Wilson et al.), U.S. Pat. No. 5,095,163 (Barger), U.S. Pat. No. 5,191,141 (Barger), U.S. Pat. No. 5,126,308 (Barger), U.S. Pat. No. 4,973,792 (Lewis), and U.S. Pat. No. 4,861,938 (Lewis). The above U.S. patents are hereby incorporated by reference.

U.S. Pat. No. 5,744,687 and U.S. Pat. No. 5,365,011 disclose a process for the integration of a PSA zone containing an adsorbent selective for the adsorption of ethylene and propylene from a catalytic cracking process at an adsorption temperature above 50° C. to about 250° C. The adsorbent is selected from the group consisting of zeolite 4A, zeolite 5A, zeolite 13X, and mixtures thereof. The adsorbed ethylene and propylene is desorbed from the adsorbent by reducing the pressure or raising the temperature, or by reducing the pressure and raising the temperature.

A paper entitled, "Olefin-Paraffin Separations by Adsorption: Equilibrium Separation by π-Complexation vs. Kinetic Separation", by S. U. Rege, J. Padin, and R. T. Yang and published in the AIChE Journal, volume 44, 1998, at page 799 and herein incorporated by reference, compares the performance of a PSA process using 4A zeolite, carbon molecular sieve, and a sorbent based on a silica substrate over which silver nitrate has been dispersed for the separation of propylene from mixtures of propylene and propane.

Recovering propylene from cracking, oxygenate conversion, and propane dehydrogenation processes is an expensive and complex process involving extensive compression and superfractionation to separate ethylene from the $C_3$ hydrocarbons, and finally superfractionation to separate the propylene from the propane. Prior attempts to employ adsorptive separation have found it difficult to achieve both high purity and high recovery of propylene. Processes are sought which enable the concentration and recovery of the propylene from cracking and oxygenate conversion effluent without expensive superfractionation steps.

It is an objective of the present invention to provide a separation process for the production of high purity propylene which does not require superfractionation.

It is an objective of the present invention to provide a process for the production of high purity propylene at a high propylene recovery.

SUMMARY OF THE INVENTION

The present invention relates to a process for the purification of propylene from a feedstream comprising propylene and propane. The present invention is based on the discovery that a small pore aluminophosphate molecular sieve, AlPO-14, can be employed in a variety of adsorptive processes to purify a propylene stream and recover a high purity propylene product stream while also obtaining a high propylene recovery. In particular, AlPO-14 was found to selectively adsorb propylene while essentially excluding propane at adsorption temperatures between about 25° C. and about 125° C. Surprisingly, it was discovered that the AlPO-14 adsorbent exhibited a favorable adsorption isotherm for propylene at propylene partial pressures up to about 4 bar (60 psia). The linear character of the AlPO-14 adsorption isotherm, particularly for propylene partial pressures below about 2 bar, makes the AlPO-14 adsorbent useful in PSA processes, temperature swing adsorption processes, combinations of pressure and temperature swing adsorption processes, vacuum swing adsorption processes, and membrane separations directed to the purification of propylene by adsorption. Furthermore, the adsorption of propylene on the AlPO-14 adsorbent appeared to approach a saturation level at which little additional adsorption occurred at adsorption pressures corresponding to propylene partial pressures above about 3 bar. Although the adsorbent has a high selectivity for the adsorption of propylene over propane and a good working capacity, it is generally a difficult problem to obtain both a high purity propylene product at a similarly high propylene recovery using an adsorption separation process. In one embodiment, a simulated moving bed adsorption process using the AlPO-14 adsorbent and employing a cycle which includes vacuum desorption provides a solution to this problem by producing a high purity propylene product and providing greater than about 80% recovery of the high purity propylene product based on the moles of propylene in the feedstream.

In one embodiment, the present invention is a process for adsorptive separation of propylene from a feedstream comprising propylene and propane. The process comprises passing the feedstream at an effective sorption temperature less than 120° C. and a sorption pressure to a sorption zone. The sorption zone contains AlPO-14, to adsorb at least a portion of the propylene and an unadsorbed stream comprising propane is withdrawn. The sorption zone is desorbed and at least a portion of the propylene is withdrawn from the sorption zone as a desorbed stream.

In another embodiment, the present invention is a simulated moving bed process for the purification of propylene from a feedstream comprising propane and propylene. The process comprises a series of steps. The feedstream and a first co-purge effluent stream at an effective adsorption pressure and effective adsorption temperature are introduced to a first adsorption bed. The first adsorption bed is one adsorption bed of a plurality of at least four adsorption beds. Each of the adsorption beds contains an AlPO-14 small pore aluminophosphate adsorbent for the selective adsorption of propylene. The first co-purge effluent stream is withdrawn from a second adsorption bed and a raffinate stream comprising propane is withdrawn from the first adsorption bed. The second adsorption bed is co-purged with a second co-purge effluent stream withdrawn from a third adsorption bed, the first co-purge effluent stream is withdrawn from the second adsorption bed. A third adsorption bed is co-purged with a compressed recycle stream and the second co-purge effluent stream is withdrawn from the third adsorption bed. A fourth adsorption bed is isolated and counter-currently depressurized to an effective desorption pressure in an evacuation step to recover a propylene product stream. At least a portion of the propylene product stream is recompressed to provide the compressed recycle stream. The fourth adsorption bed is counter-currently repressurized with at least a portion of the raffinate stream to provide a repressurized fourth adsorption bed. The feedstream is advanced to provide feed to the repressurized fourth adsorption bed and the positions among said plurality of adsorption beds are switched such that each of said adsorption beds effectively advances by one adsorption bed with respect to the first adsorption bed to provide a continuous process.

BRIEF DESCRIPTION OF THE FIGURES

FIG. 2 is an adsorption isotherm for propylene over AlPO-14 adsorbent at 25° C.

FIG. 3 is an adsorption isotherm for propylene over AlPO-14 adsorbent at 70° C.

FIG. 4 is an adsorption isotherm for propylene over AlPO-14 adsorbent at 120° C.

FIG. 5 is a chart illustrating the propylene loading during the simulated moving bed process of the present invention

DETAILED DESCRIPTION OF THE INVENTION

Figure 1:
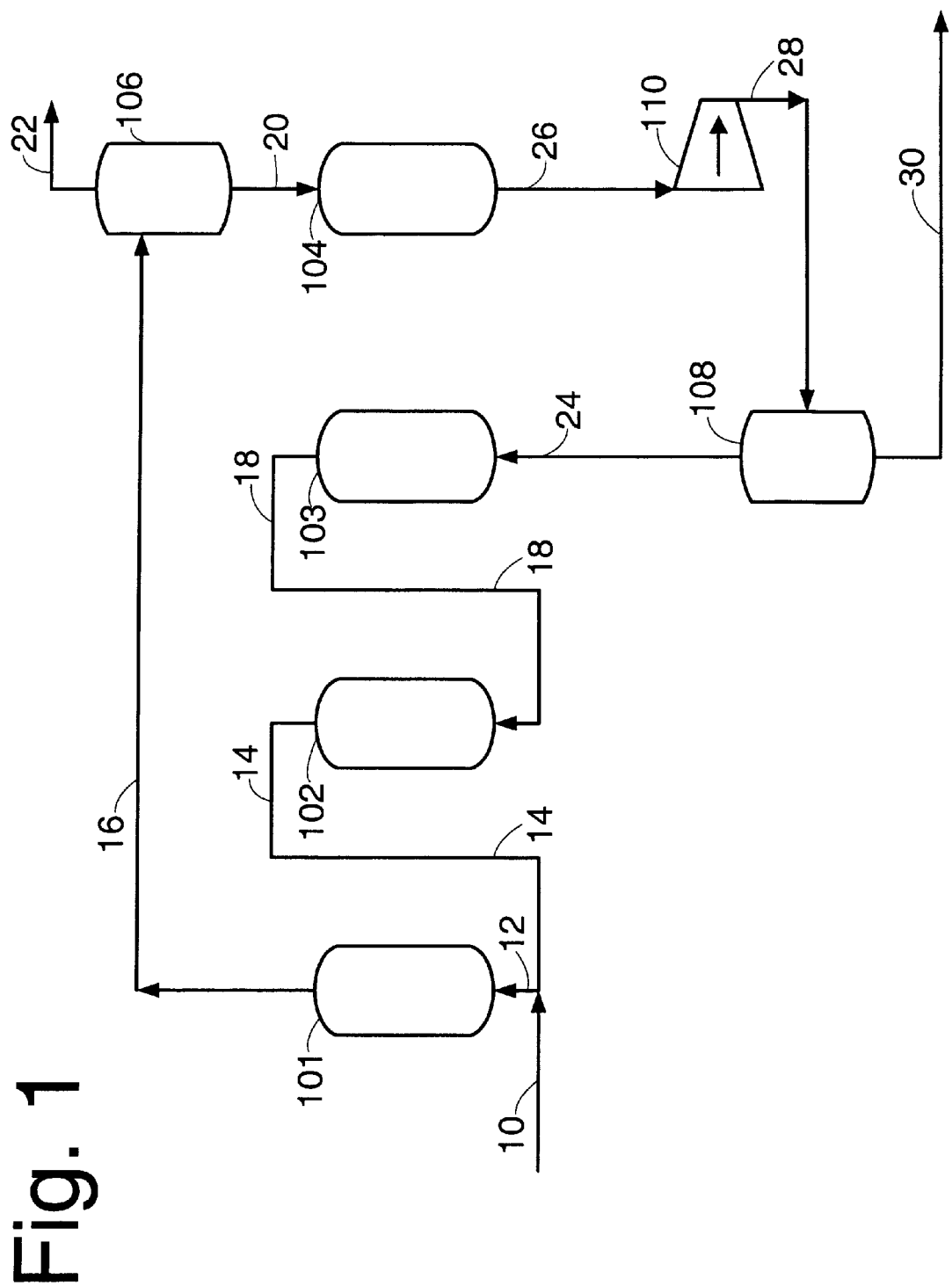
FIG. 1 is a simplified process flow diagram of a preferred embodiment of the present invention.

The present invention is directed to the separation of propane from a feedstream comprising propane and propylene in an adsorption process to produce an adsorbed phase rich in propylene and a non-adsorbed phase rich in propane. Some non-condensables such as carbon dioxide, carbon monoxide, and hydrogen which may be present in commercially available feedstreams comprising propylene and propane will appear in the non-adsorbed phase. Upon desorption at a desorption pressure, that is reduced relative to the adsorption pressure, the propylene is recovered as a high purity propylene product. Preferably, a high purity propylene product comprises at least 95 mol-% propylene, and more preferably, the high purity propylene product comprises at least 99 mol-% propylene.

It was discovered that the AlPO-14 adsorbent of the present invention can be employed in an adsorptive separation process at an effective adsorption temperature less than 120° C. Propane appeared to be excluded from the AlPO-14 and the amount adsorbed was experimentally not detectable at adsorption temperatures between about 25° C. and 120° C. This implies a high selectivity for propylene based on molecular size exclusion. Preferably, the AlPO-14 adsorbent is employed at an effective adsorption temperature between about 25° C. and 120° C. More preferably, the AlPO-14 adsorbent is employed at an effective adsorption temperature between about 70° C. and about 100° C. The effective total pressure for adsorption may range between about 0.5 bar and about 30 bar, and the effective total pressure for desorption may range from about millibars to about 1 bar. The use of AlPO-14 was found to be sensitive to the adsorption pressure. More particularly, the AlPO-14 was found to be sensitive to the propylene partial pressure at the adsorption conditions. The propylene partial pressure is the contribution of the propylene fraction to the total pressure of the stream. At adsorption conditions wherein the propylene partial pressure is high, it is believed that adsorbed propylene may partially condense on the adsorbent, reducing the adsorption capacity and effectiveness of the adsorbent. When the adsorption temperature is less than 120° C., the propylene partial pressure for effective adsorption comprises less than about 4 bar. As the adsorption temperature is reduced, the effective adsorption pressure is reduced. Preferably, when the adsorption temperature ranges between about 70° C. and about 100° C., the propylene partial pressure for effective adsorption comprises between about 0.5 and about 2 bar. The process of the present invention can be carried out in a separation zone selected from the group consisting of a PSA zone, a vacuum swing adsorption zone, a temperature swing adsorption zone, and a membrane separation zone. Vacuum desorption, heating, and combinations thereof are preferred to remove adsorbed propylene from the AlPO-14 adsorbent. Preferably, the propylene partial pressure for effective desorption pressure ranges between about 0.01 and 0.5 bar. If heating is employed for desorption, it is preferred to employ a heated purge gas to counter-currently purge an adsorption bed. Preferably, the heated purge gas is heated to a desorption temperature of between about 70° C. and 120° C.

The feedstream, comprising propane and propylene, may contain from about 5 to about 90 mol-% propylene with the remainder being essentially propane. The feedstream may be derived from any hydrocarbon cracking or formation process generally employed in the petroleum refining and petrochemical industries. Such cracking processes may include the cracking of natural gas, naphtha, and atmospheric gas oil for the production of ethylene and also producing propylene as a by-product. The feedstream may also be produced in a process for the conversion of an oxygenate into light olefins. In general, the reaction products of these processes are compressed and fractionated in a conventional manner to produce the feedstream for the present invention.

The adsorbent of the present invention preferably is incorporated into solid particles in which the adsorbent is present in an amount effective to promote the desired hydrocarbon separation. Solid particles comprising the molecular sieve and a binder may be formed into shapes such as pills, pellets, granules, rings, spheres, etc. Generally a slurry mixture comprising the molecular sieve, binder and water is prepared and the slurry mixture is blended by sonification, milling, etc. prior to formation of the solid particles by extrusion, spray-drying, etc. In one aspect, the solid particles comprise an adsorptively effective amount of the adsorbent and at least one matrix material, preferably selected from the group consisting of binder materials, filler materials, and mixtures thereof to provide a desired property or properties, e.g., desired adsorbent dilution, mechanical strength, and the like to the solid particles. Filler and binder materials include, for example, synthetic and naturally occurring substances such as metal oxides, clays, silicas, aluminas, silica-aluminas, silica-magnesias, silica-zirconias, silica-thorias, silica-berylias, silica-titanias, silica-alumina-thorias, silica-alumina-zirconias, alumino-phosphates, mixtures of these, and the like. The preparation of solid particles comprising adsorbent and matrix materials is conventional and well known in the art and, therefore, need not be discussed in detail.

It was discovered that AlPO-14, a small pore aluminophosphate molecular sieve, selectively adsorbed propylene and essentially excluded propane. AlPO-14 as disclosed in U.S. Pat. No. 4,310,440 is a member of a class of aluminophosphates ($AlPO_4$-n) which have various crystalline structures (current references to such compounds no longer use the subscript 4). The class of materials contains structures wherein the frameworks are composed of tetrahedral $AlO_4$ and $PO_4$ units. One characteristic of this class of non-zeolitic materials is that the structures do not contain framework charge balancing cations like those contained in zeolite molecular sieve structures. Although non-zeolite frameworks are electrically neutral, adsorbate molecules; that is, molecules adsorbed on the framework of these materials, can interact with a local non-zero electric field present on the surface of the structure. It is believed that this local electric field can arise from the difference in electronegativities between the aluminum and phosphorous atoms making up the structure. One key feature of the AlPO-14 structure is its pore window diameter which is about 3.8 angstroms. Although the pore size of the AlPO-14 is essentially the same as a zeolite 4A, the AlPO-14 has a different crystalline structure which can be considered a channel system of small pores that is capable of excluding the entry of propane by a steric hindrance effect which prevents the propane from entering into the internal pore/channel structure, while permitting the relatively rapid adsorption and desorption of propylene.

In one embodiment, a modified adsorption process is employed to produce a high purity propylene stream at a high recovery. By the term "high purity propylene", it is meant that the high purity propylene product stream comprises at least 90 mol-% propylene. More preferably, the high purity propylene stream comprises at least 95 mol-%, and most preferably, the high purity propylene product stream comprises at least 99 mol-% propylene. By the term "high recovery", it is meant that the high purity propylene product recovered comprises at least 80% of the propylene in the feedstream to the process. Preferably, the recovery of high purity propylene comprises at least 90% of the propylene in the feedstream to the process.

Simulated moving bed processes are generally not used for separation of hydrocarbon vapors. In a simulated moving bed process, shifting the positions of the input and output streams to a process in the direction of the fluid flow through a bed simulates the movement of a solid bed in the opposite direction. Applicant has employed a simulated moving bed concept and applied it to the purification of propylene for simultaneously obtaining a high recovery of the valuable high purity propylene product. Commercially, moving positions, or locations, of input and output locations relative to a plurality of beds may be accomplished by a variety of fluid directing devices such as rotary valves or a network of two-position or multi-position valves which work in conjunction with the inlet and outlet lines between beds. The fluid directing device accomplishes moving the locations of the input and output streams through first directing the streams to the appropriate inlet and outlet lines of the adsorbent beds. After a specified period of time, or step time, the fluid directing device advances one index and redirects the streams to the inlet or outlet to a new adjacent location which is downstream of the previous location. Unlike liquid phase simulated moving bed processes, the process of the present invention does not employ a desorbent. In the present invention, the adsorption beds are purged with the adsorbed component, propylene, and desorption occurs by vacuum depressurization or a combination of vacuum depressurization and heating. Each advancement of the fluid directing device to a new position is generally called a step and the completion of all valve steps is called a cycle. The step time is generally uniform for each step in a cycle, and the cycle time ranges generally from about 2 minutes to about 20 minutes. In one embodiment of the present invention, the evacuation step, or counter-current depressurization step, and the repressurization step take place within one step of the simulated moving bed cycle. Details of arranging commercially available two-position and multi-position valves for the operation of the simulated moving bed process of the present invention are well known to those skilled in the art and need not be discussed further.

It is preferred that the simulated moving bed cycle of the present invention comprise at least three serially connected adsorption beds. The three serially connected adsorption beds include the adsorption bed undergoing the adsorption step, and at least two other adsorption beds undergoing a serially connected co-purge step. It is well within the scope of the present invention for a simulated moving bed cycle of the present invention to comprise one adsorption bed undergoing an adsorption step; a second adsorption bed undergoing an evacuation or counter-current depressurization step followed by a repressurization step; and from 2 to about 10 adsorption beds undergoing a serially connected co-ptirge step wherein the adsorption bed undergoing the adsorption step and the serially connected beds are essentially operated at the adsorption pressure and the adsorption bed undergoing the counter-current depressurization step is operated at a desorption pressure. It was discovered that the selection of the desorption temperature established the operable range of adsorption and desorption pressures. An adsorption pressure above the operable range for a given temperature could result in the formation of liquids on the adsorbent which would reduce the efficiency of the process.

The process for the separation of propylene of the present invention can advantageously be employed in a wide variety of petroleum refining and petrochemical operations where the objective is the purification of a propane/propylene stream or the recovery of propylene from a vent stream. The present invention can be used alone or in any combination with fractionation to perform a rough-cut separation prior to final fractionation, or can be used in a scheme wherein fractionation may perform a rough-cut distillation followed by the adsorption process of the present invention as a finishing step. Examples of such applications include recovering propylene from the vent streams of a polypropylene process, recovering propylene from mix $C_3$ hydrocarbons produced in a fluid catalytic cracking unit, and recovering propylene in a light ends fractionation plant in an ethylene plant or downstream from a conversion process for the production of light olefins from oxygenates. There are also applications in the propylene derivative technology areas such as hydrocarbon alkylation, isopropanol production, hydrocarbon partial oxidation, oxo alcohol production, etc. In such applications, the buildup of propane is often purged along with valuable propylene. Using the present invention, the propylene in these vent streams can be effectively recovered and returned to the reaction zone for improved conversion and overall process improvement.

One unexpected benefit of the simulated moving bed cycle of the present invention is the combination of the production of high purity propylene and the achievement of high recovery rates of the propylene product over the AlPO-14 adsorbent.

DETAILED DESCRIPTION OF THE FIGURES

In FIG. 1, the process of the present invention is illustrated by means of a simplified flow diagram in which pumps, instrumentation, valves, heat exchange and heat recovery circuits, compressors, and similar hardware have been deleted as being non-essential to an understanding of the techniques involved. The use of such miscellaneous equipment is well within the purview of one skilled in the art. Referring to FIG. 1, a feedstream comprising propylene and propane is passed in line 10 and line 12 to a first adsorption bed 101 of a plurality of adsorption beds referred to as adsorption beds 101, 102, 103, and 104. Each of the adsorption beds contains an adsorbent which comprises AlPO-14 and a binder. The feedstream in line 10 is combined with a first co-purge stream, or a second co-purge effluent stream, in line 14 withdrawn from a second adsorption bed 102. A feed admixture of the feedstream in line 10 and the second co-purge effluent stream in line 14 is passed to the first adsorption bed 101 via line 12. A raffinate stream is withdrawn from the first adsorption bed 101 in line 16. The raffinate stream comprises the non-adsorbed propane. The raffinate stream in line 16 is passed to a raffinate tank 106. A raffinate product stream comprising propane is withdrawn from the process in line 22. The second adsorption bed 102 and the third adsorption bed 103 are connected in series via line 18 and are co-purged by a recycle stream in line 24 which is introduced to adsorption bed 103. Thus, adsorption beds 101, 102, and 103 are connected in series by lines 14 and 18. A third co-purge effluent stream is withdrawn from adsorption bed 103 in line 18 and passed as the second co-purge stream to adsorption bed 102. The second co-purge effluent stream is withdrawn from adsorption bed 102 in line 14. A fourth adsorption bed 104 is isolated from the other adsorption beds, undergoes a counter-current depressurization step wherein the adsorption bed 104 is counter-currently depressurized and evacuated to a desorption pressure, and a propylene stream is withdrawn in line 26. The propylene stream in line 26 is passed to a compressor 110 to compress at least a portion of the propylene stream in line 26 to essentially the adsorption pressure to provide a compressed propylene product stream in line 28. The compressed propylene product stream in line 28 is passed to the product tank 108. At least a portion of the compressed propylene product stream is withdrawn from product tank 108 and passed via line 24 as the recycle stream which was introduced to adsorption bed 103. A compressed propylene product stream is withdrawn from the product tank in line 30. At the conclusion of the counter-current depressurization step, adsorption bed 104 is repressurized to about the adsorption pressure by the counter-current introduction, or repressurization, with at least a portion of the raffinate stream withdrawn from the raffinate tank 106 via line 20. This completes one step in a continuous process. At the conclusion of the repressurization step, adsorption bed 104 is placed in the first position and the other adsorption beds advance one position such that the feed admixture is now introduced to adsorption bed 104, adsorption beds 101 and 102 are connected in series to provide the second co-purge effluent stream to be admixed with the feedstream, and adsorption bed 103 undergoes the counter-current depressurization, or evacuation step, to provide the propylene product stream and the repressurization step. The cycle comprising the adsorption step, the series connected co-purge step, and the counter-current depressurization and repressurization step is repeated to provide a high purity propylene product stream at a recovery of at least 85% based on the feedstream. Optionally, additional adsorbent beds containing the AlPO-14 adsorbent can be incorporated into the process of the present invention such that the additional beds extend the number of adsorbent beds connected in series for the co-purge portion of the cycle. In this manner, each adsorbent bed would undergo at least two co-purge steps per cycle. For example, the addition of a fifth adsorbent bed between adsorbent bed 102 and adsorbent bed 103, serially connected in a similar fashion, would increase the number of co-purge steps per cycle to three, with a corresponding improvement in the purity of the propylene product. The addition of between any number of adsorbent beds within the serially connected co-purge portion of the cycle will improve the purity and the recovery of the propylene product, but will also increase the cost of the plant.

EXAMPLES

Example I

The propylene adsorption screening tests were conducted in a modified BET adsorption apparatus. The apparatus measures adsorption by sensing changes in pressure and temperature inside a reference volume which is attached to an adsorption vessel containing the adsorbent sample. The adsorbent sample was maintained at a steady temperature by the action of a temperature-controlled bath. The reference volume can be isolated from the adsorbent vessel by means of an isolation valve. The reference volume may also be connected or isolated from a gas source by means of another isolation valve, and finally the absolute pressure of the reference volume may be controlled by means of a high vacuum pump which is also connected to the reference volume by means of a third isolation valve. Adsorption measurements were made by first evacuating the reference volume and the adsorbent sample vessel to a pressure of approximately $5 \times 10^{-6}$ torr while heating the adsorbent and adsorbent vessel to an activation temperature of approximately 350° C. The temperature of activation was controlled and monitored. The activation was considered complete after the pressure of the system was dropped to $5 \times 10^{-6}$ torr (generally about 16 hours). After activation, the sample was isolated from the reference volume and the evacuation pump and was cooled to the desired adsorption temperature. The reference volume also evacuated to $5 \times 10^{-6}$ torr was also isolated from the vacuum pump and was charged to a vapor pressure of about 5 torr with about 99.99 mol-% (research grade) pure propylene gas. The pressure of gas was monitored by an MKS Baratron Pressure Transducer. Once stable readings were obtained on both the pressure and temperature within the reference volume, the isolation valve separating the adsorbent sample from the reference volume was opened and the pressure and temperature of the system were monitored until they stabilized, i.e., changing no more than by 1 part in $10^6$ torr within one minute. Propylene isotherms were obtained by repeating the isolation, charging and equilibration of the reference volume with the adsorbent vessel until a pre-determined loading level or pressure level were obtained. Propylene loadings on the adsorbent samples were reported in FIGS. 2, 3, and 4 as a function of the pressure of the propylene vapor in terms of the mmols/g of the propylene gas loaded on the adsorbent for zeolite 4A and AlPO-14, a small pore aluminophosphate, respectively. The isotherms for the 4A zeolite and AlPO-14 adsorbents were determined at 25° C., 70° C., and 120° C. A comparison of the results at 25° C., 70° C., and 120° C. indicate that the 4A zeolite adsorption isotherms exhibited a sharp initial adsorption of the propylene at very low pressures (less than 0.3 bar (5 psia)) and then a very small incremental adsorption as the pressure is increased to about 1 bar. Surprisingly, the AlPO-14 adsorbent exhibited a more gradual adsorption slope as a function of increasing pressure relative to the 4A zeolite, and the AlPO-14 isotherms became more linear in character as the temperature approached 120° C. Surprisingly, propane was found to be essentially excluded from the AlPO-14 adsorbent at 25° C., 70° C. and 120° C. Propane adsorption was apparently below the detection limit of the apparatus.

Example II

Table 1 presents a comparison adsorbent loading capacity for pure propylene over a range of adsorption pressure between about 0.5 bar and 1 bar at adsorption temperatures between about 25° C. and about 120° C. for the AlPO-14 adsorbent of the present invention and zeolite 4A, the adsorbent representative of the prior art. The loading capacities shown were determined from the AlPO-14 isotherm data generated in Example I. The zeolite 4A capacity loadings were similarly derived. Surprisingly, the AlPO-14 indicates significant adsorption capacity at temperatures below 120°

C. where, at the corresponding conditions, the zeolite 4A indicated essentially no adsorption capacity.

TABLE 1

Comparison of Adsorbent Loading Capacity, mmol/g

| Adsorption Pressure Range | Adsorption Temperature, ° C. | | |
|---|---|---|---|
| (0.5 to 1.0 bar) | 25 | 70 | 120 |
| AlPO-14 | 0.15 | 0.4 | 0.38 |
| Zeolite 4A (Prior Art) | nil | nil | 0.35 |

Example III

The adsorbent loading capacity for pure propylene of the AlPO-14 adsorbent increased with increasing pressure up to about 2 bar. Table 2 presents the adsorbent capacity of the adsorbent of the present invention over a pressure range between about 0.3 bar and about 2.0 bar. These results indicate almost a linear increasing capacity with increasing pressure range up to about 2.0 bar. Surprisingly, it was discovered that little increase in capacity resulted from extending the final pressure above about 2 bar.

TABLE 2

AlPO-14 Adsorbent Loading Capacity, mmol/g

| Adsorption Pressure Range | Adsorption Temperature, ° C. | | |
|---|---|---|---|
| (0.3 to 2.0 bar) | 25 | 70 | 120 |
| AlPO-14 | 0.45 | 0.70 | 0.70 |

Example IV

An engineering process simulation, based on the data generated in Example I, was developed to evaluate the performance of the simulated moving bed vacuum swing process unit of the present invention. The feedstream comprised a mixture of 70 mol-% propylene and 30 mol-% propane. The process is carried out as described with respect to FIG. 1 with four adsorbent beds containing an adsorbent comprising AlPO-14. The operating conditions of the evaluation include an adsorption temperature of about 100° C., an adsorption pressure of about 3 bar, and a desorption pressure of 0.07 bar. The propylene profiles in the gas and solid phase of the adsorption beds in series (adsorption beds 101, 102, 103) vs. dimensionless bed position are shown in FIG. 5 at a point in the cycle during which adsorption bed 101 undergoes the adsorption step and adsorption beds 102 and 103 are serially connected in a co-purge step. The feedstream and the first co-purge effluent stream are introduced to adsorption bed 101 shown at bed 1 position between bed 1 and bed 2 on FIG. 5. At steady state, the gas phase propylene purity passing through adsorption bed 103 (through beds 2 and 3 in FIG. 5) is at about 99.5 mol-%. On evacuation, the propylene product will reflect this purity. Process simulation results show that the propylene product with a purity of equal to or greater than about 99.5 mol-% can be produced at a propylene recovery in excess of 90% based on the propylene in the feedstream.

Example V

A hysteresis effect was observed when comparing the adsorption branch of the adsorption isotherm for propylene over AlPO-14 with a desorption branch obtained by reversing the steps of Example I and measuring the adsorbent loadings as the pressure is reduced. The AlPO-14 adsorbent exhibited a tendency to retain the adsorbed species, propylene. The hysteresis effect is strong at low temperatures; however, as the temperature is increased, the hysteresis effect was reduced. To illustrate this phenomenon, Table 3 presents a summary of the propylene loading on desorption to about 0.2 bar over a range of desorption temperature from about 25° C. to 120° C. It was found that the residual propylene loading decreased with increasing temperature, suggesting the use of the addition of a heated purge step in pressure swing and vacuum adsorption processes to return the adsorbent to essentially fuill adsorption capacity between cycles when the adsorption temperature approaches 25° C.

TABLE 3

Residual Desorption Capacity, mmol/g

| | Desorption Temperature, ° C. | | |
|---|---|---|---|
| Desorption Pressure, bar | 25 | 70 | 120 |
| 0.2 | 0.8 | 0.4 | 0.2 |

What is claimed is:

1. A process for adsorptive separation of propylene from a feedstream comprising propylene and propane, said process comprising:
 a) passing the feedstreani at an effective sorption temperature less than 120° C. and a sorption pressure to a sorption zone wherein said sorption zone comprises AlPO-14, to adsorb at least a portion of the propylene and withdrawing an unadsorbed stream comprising propane; and
 b) desorbing at least a portion of the propylene from the sorption zone and withdrawing a desorbed stream.

2. The process of claim 1 wherein step (b) comprises reducing pressure of the sorption zones.

3. The process of claim 1 wherein step (b) comprises a combination of reducing pressure and heating of the sorption zone.

4. The process of claim 1 wherein step (b) comprises heating of the sorption zone.

5. The process of claim 1 wherein the sorption zone is selected from the group consisting of a pressure swing adsorption, vacuum swing adsorption, and temperature swing adsorption.

6. The process of claim 1 wherein the sorption zone is selected from the group consisting of temperature swing adsorption, pressure swing adsorption, vacuum swing adsorption, and combinations thereof.

7. The process of claim 1 wherein the effective sorption temperature ranges between about 25° C. and 120° C. and the sorption pressure comprises a propylene partial pressure between about 0.5 bar and about 4 bar.

8. The process of claim 1 wherein the effective sorption temperature ranges between about 70° C. and about 100° C. and the sorption pressure comprises a propylene partial pressure between about 0.5 bar and about 2 bar.

9. The process of claim 1 wherein step (b) comprises depressutizing the sorption zone to an effective desorption pressure comprising a propylene partial pressure between about 0.01 bar and about 0.5 bar.

10. A simulatedmoving bed process for the purification of propylene from a feedstream comprising propane and propylene, said process comprising:

a) introducing a feedstream and a first co-purge effluent stream at an effective adsorption pressure and adsorption temperature to a first adsorption bed of a plurality of at least tour adsorption beds containing an AlPO-14 small pore aluminophosphate adsorbent for the selective adsorption of propylene, said first co-purge effluent stream being withdrawn from a second adsorption bed and withdrawing a raffinate stream comprising propane from the first adsorption bed;

b) co-purging a second adsorption bed with a second co-purge effluent stream withdrawn from a third adsorption bed and withdrawing the first co-purge effluent stream;

c) co-purging the third adsorption bed with a compressed recycle stream and withdrawing the second co-purge effluent stream;

d) isolating and counter-currently depressurizing a fourth adsorption bed to an effective desorption pressure in an evacuation step to recover a propylene product stream;

e) recompressing at least a portion of the propylene product stream to provide the compressed recycle stream, f) counter-currently repressurizing the fourth adsorption bed with at least a portion of the raffmate stream to provide a repressurized fourth adsorption bed; and g) advancing the fcedstream to the repressurized fourth adsorption bed and switching the positions among said plurality of adsorption beds such that each of said adsorption beds effectively advances by one adsorption bed with respect to the first adsorption bed to provide a continuous process.

11. The simulated moving bed process of claim 10 wherein the propylene product stream comprises greater than about 95 mol-% propylene and is recovered at a recovery comprising greater than about 85%.

12. The simulated moving bed process of claim 10 wherein the adsorption temperature comprises less than 120° C. and the adsorption pressure comprises a propylene partial pressure between about 0.5 and about 4 bar.

13. The simulated moving bed process of claim 10 wherein the adsorption temperature comprises between 25° C. and 120° C. and the adsorption pressure comprises a propylene partial pressure between about 0.5 and about 4 bar.

14. The simulated moving bed process of claim 10 wherein the adsorption temperature comprises less than 100° C. and the adsorption pressure comprises a propylene partial pressure between about 0.5 and about 4 bar.

15. The simulated moving bed process of claim 10 wherein the desorption pressure comprises a propylene partial pressure between about 0.01 bar and about 0.5 bar.

* * * * *